Figure 1:
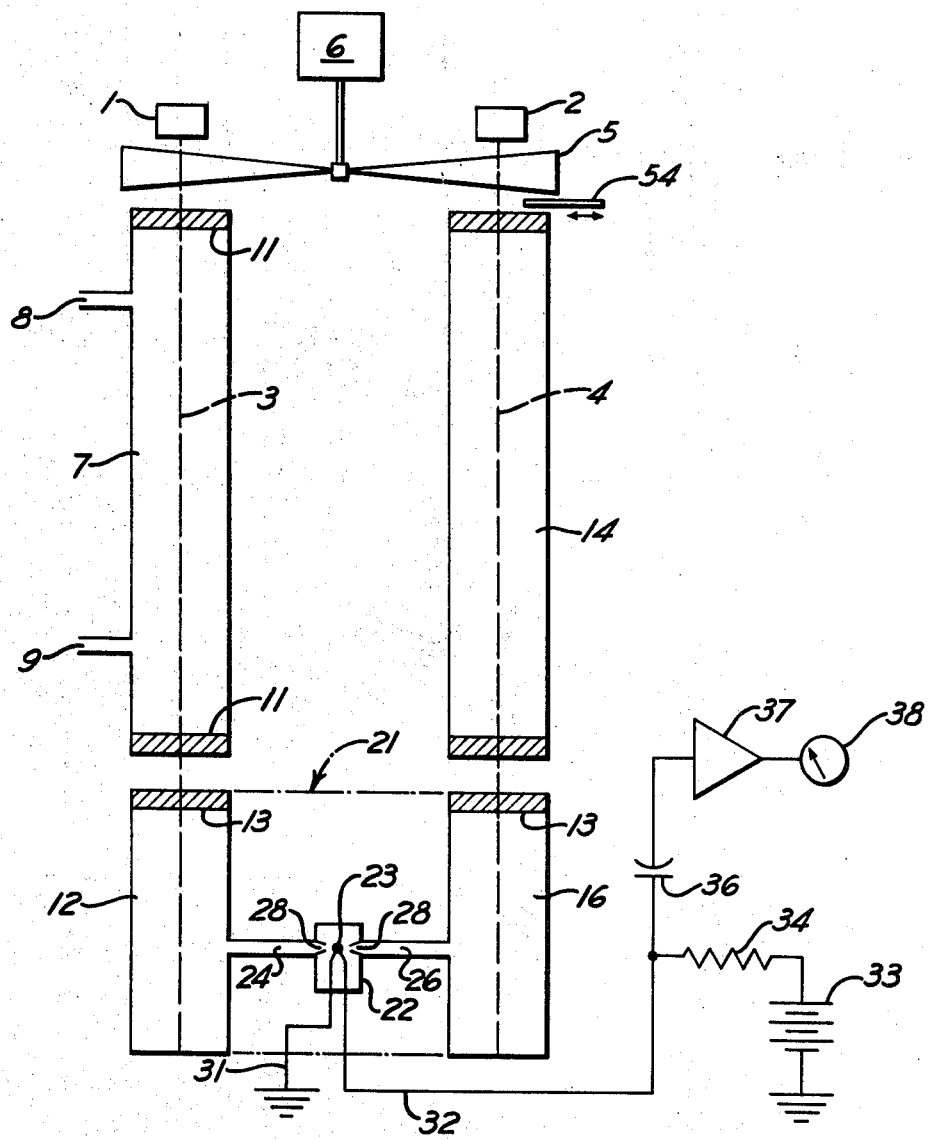

United States Patent

[11] 3,560,738

| [72] | Inventor | John P. Strange<br>Murrysville, Pa. |
|---|---|---|
| [21] | Appl. No. | 766,227 |
| [22] | Filed | Oct. 9, 1968 |
| [45] | Patented | Feb. 2, 1971 |
| [73] | Assignee | Mine Safety Appliances Company<br>Pittsburgh, Pa.<br>a corporation of Pennsylvania |

[54] FLOW-RESPONSIVE DETECTOR UNIT AND ITS APPLICATIONS TO INFRARED GAS ANALYZERS
18 Claims, 6 Drawing Figs.

[52] U.S. Cl. .................................................. 250/43.5
[51] Int. Cl. .................................................. G01n21/26,
                                                        G01n 21/34
[50] Field of Search .......................................... 250/43.5

[56] References Cited
UNITED STATES PATENTS

| 2,555,327 | 6/1951 | Elliott | 250/43.5 |
| 2,650,307 | 8/1953 | Koppius | 250/43.5 |
| 3,279,308 | 10/1966 | Bartz et al. | 250/43.5X |

FOREIGN PATENTS

| 786,516 | 11/1957 | Great Britain | 250/43.5 |
| 953,952 | 4/1964 | Great Britain | 250/43.5 |

Primary Examiner—William F. Lindquist
Attorney—Brown, Critchlow, Flick & Peckham ABSTRACT: A flow responsive detector for use in an infrared gas analyzer includes a pair of gas chambers, at least one of which is adapted to be irradiated by a pulsed beam of infrared energy to produce alternate heating and cooling, and concomitant expansion and contraction, of the gas therein when that gas contains a radiation absorbing component. A sensor responsive to gas flow in the form of a thermistor that has a negative temperature coefficient of resistance and a rate of change of resistance that varies inversely with temperature is mounted in a flow chamber which is connected by a separate passage with each gas chamber. Where these passages enter the flow chamber, they are provided with jet orifices for directing a high velocity stream or jet flow of gas on the sensor in response to the expansion and contraction of gas in at least one of the gas chambers, thereby greatly enhancing the favorable nonlinear response characteristics of the sensor. The use of this detector unit in infrared analyzer systems permits many advantageous modifications of those systems, including the elimination of a separate sample cell.

3,560,738

FLOW-RESPONSIVE DETECTOR UNIT AND ITS APPLICATIONS TO INFRARED GAS ANALYZERS

This invention relates to a flow responsive detector unit, and various applications thereof, in an infrared gas analyzer of the general type in which the gas component of interest is selectively detected and measured by its absorption of a pulsed beam of infrared energy. It is a primary object of the invention to provide a detector unit of the foregoing type that incorporates an electrically heated resistance sensor responsive to cooling by gas flow and having a rate of change of resistance that varies inversely with temperature, and that includes means for enhancing the favorable nonlinear response characteristics of such a sensor to increase its sensitivity of the instrument. Another object is to provide novel applications of the foregoing detector unit to the infrared analysis of gases, including simplified systems with increased sensitivity and other advantages, as for example, the elimination of a separate sample cell.

Figure 4:
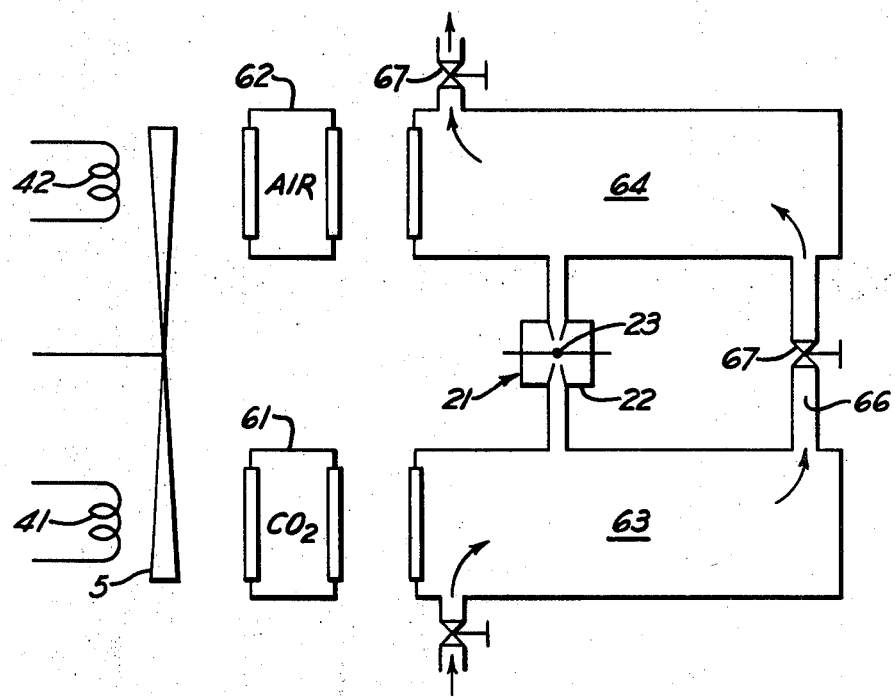
Figure 5:
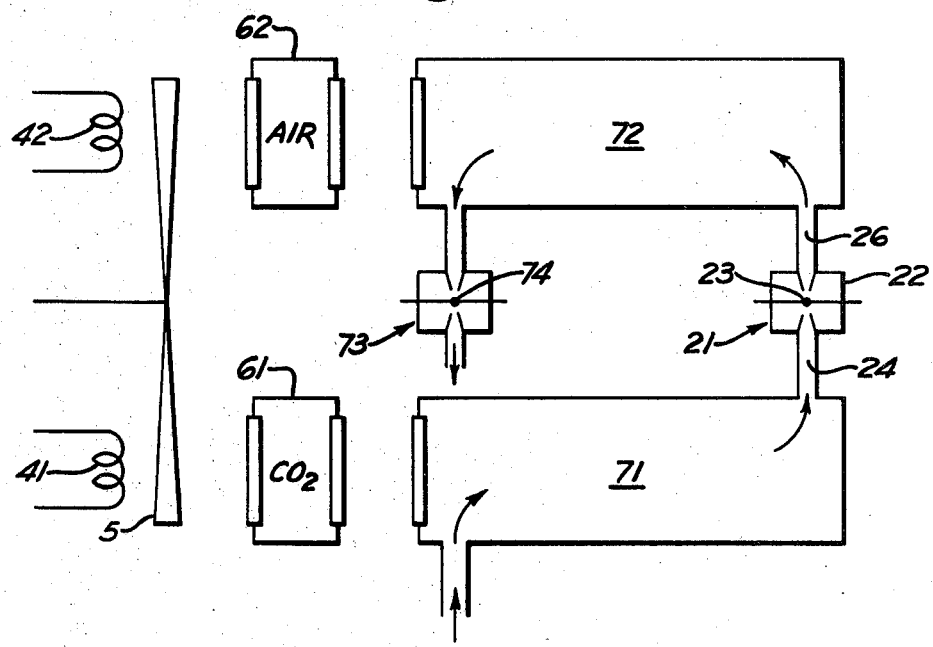
Figure 6:
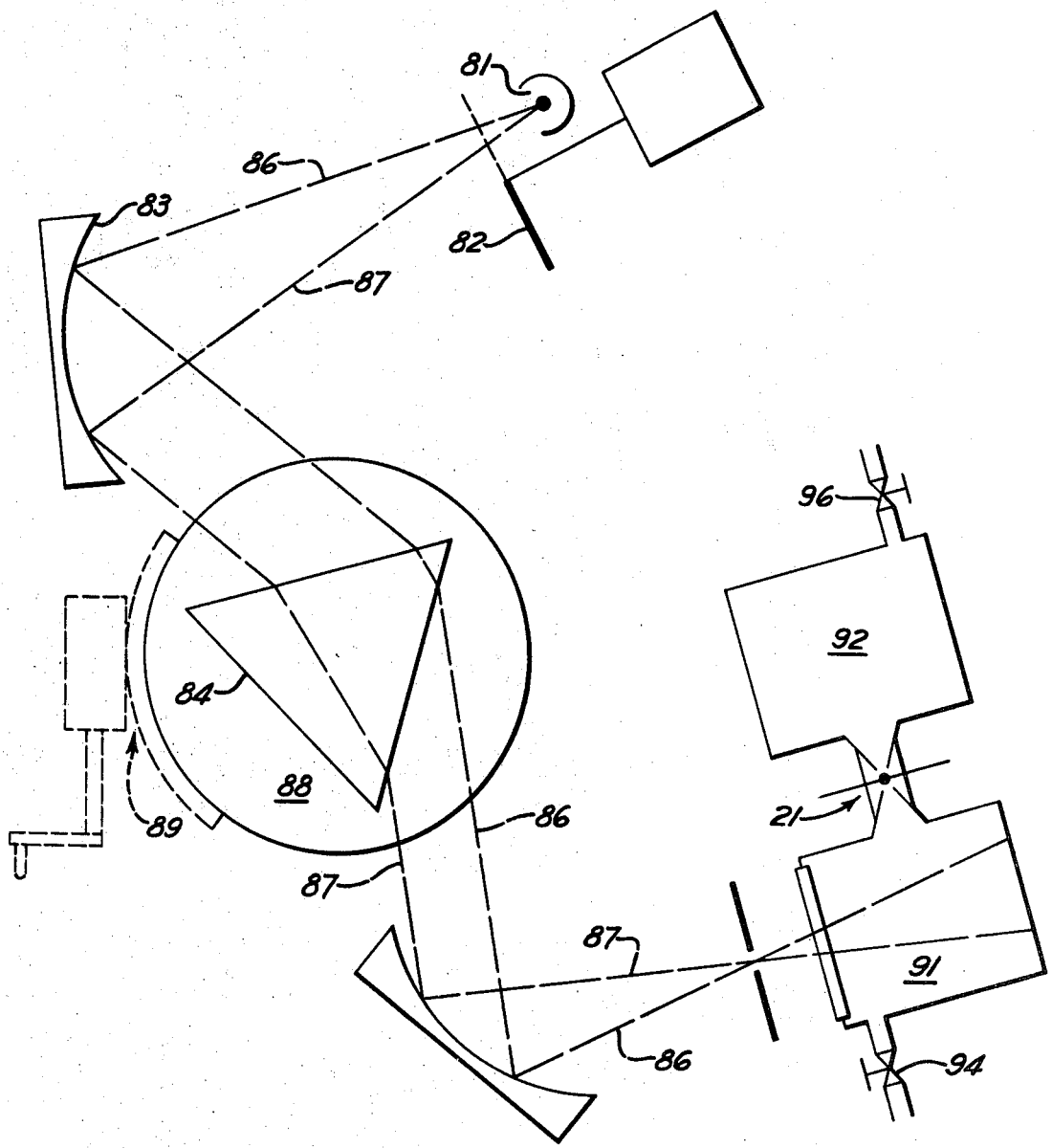

Further objects of the invention will be apparent from the following description of a preferred embodiment in connection with the attached drawings, in which:

FIG. 1 represents a diagrammatic view of a nondispersive double beam infrared gas analyzer incorporating the detector of this invention;

FIGS. 2—5 are diagrammatic views of modified forms of nondispersive infrared analyzers incorporating said detector; and FIG. 6 is a diagrammatic view of a dispersive-type single beam infrared has analyzer incorporating the present invention.

The present invention is concerned, among other things, with providing means to enhance certain physical characteristics of a sensor, such as a thermistor, to increase its sensitivity in response to the cooling effect of gas flow over its surface. A thermistor is a thermally sensitive electrically resistive element with a negative temperature coefficient of resistance, i.e., its resistance increases with a decrease in its temperature. Further, the rate of change of resistance varies inversely with the temperature, i.e., the resistance increases at a faster rate for each change of unit temperature as the temperature decreases. These characteristics give to the thermistor a nonlinear response to gas flow that is highly favorable to the use of such an element as a sensor responsive to a decrease in temperature. If the thermistor is heated by an applied external voltage to a temperature above the ambient temperature and if a gas of lower temperature is flowed over the thermistor surface, the cooling effect of the gas will produce an increased electrical resistance in the thermistor and the rate of change of that resistance will in turn increase the lower the temperature to which the thermistor is cooled. The invention is also predicated on the discovery that if the velocity of the gas flowing over the surface of the thermistor is increased, there results a disproportionate increase in output signal or sensitivity, merely because of the change in gas velocity. In other words, if the gas velocity is doubled the increase in response is more than doubled. A similar effect is obtained with other flow responsive sensors, such as a hot wire, even though they do not have the nonlinear temperature resistance characteristics of a thermistor.

The flow-responsive detector unit of the present invention is provided with a pair of gas chambers at least one of which is adapted to be irradiated by a pulsed beam of infrared energy and to contain a gas absorbing such energy. A gas flow chamber is connected to each of the gas chambers by a separate passage that terminates at the flow chamber in a jet orifice. These orifices provide high velocity jet flow in the flow chamber in response to the alternate expansion and contraction of the gas in at least one of the gas chambers when subjected to pulsed radiation. In other words, the gas that is irradiated and contains a radiation absorbing component will alternately increase and decrease in temperature, thereby causing the gas to expand and contract and to flow from one gas chamber to the other. Preferably, a thermistor sensor that is responsive to gas flow and has a negative temperature coefficient of resistance over a portion of its temperature range and a rate of change of resistance that, unlike a hot wire, varies inversely with temperature is mounted in the flow chamber in the path of the jet flow from the orifices. Alternatively, though with considerable loss of sensitivity, a sensor, such as a hot wire, can be used in place of a thermistor. The response of the sensor can be used to create a fluctuating signal in a conventional electrical measuring circuit.

Although the foregoing detector unit is described herein in connection with specific types of nondispersive and dispersive selective infrared gas analyzers, it should be understood that it is equally applicable to other types of infrared gas analyzers in which the gas component of interest is selectively detected and measured by the absorption of a pulsed beam of infrared energy, whether the analyzer is of the double or single beam type and whether, in the case of the double beam type, the beams are pulsed simultaneously or alternately.

In FIG. 1, the analyzer is of the double beam nondispersive type that includes a source of infrared radiation, shown here as two substantially indentical, side-by-side sources 1 and 2, although it is obvious that they could be combined into a single source and then split, for transmitting radiation along two parallel beam paths. One of those beams, herein called the analytical beam, is composed of rays from source 1 extending parallel to the optical axis 3 (shown in broken lines). The other beam, herein called the reference beam, consists of rays from source 2 and extends parallel to the axis 4. The analytical beam passes from source 1 through a chopper region, where the rays are periodically interrupted by a shutter device 5 rotated by an electric motor 6. The beam then goes through a sample or analytical cell 7, which is provided with a gas inlet 8 and a gas outlet 9 and is otherwise sealed from the atmosphere by infrared-transparent windows 11 at each end. Finally, the analytical beam enters an analytical gas absorption chamber 12 through a window 13 similar to windows 11.

The reference beam follows a path parallel to the analytical beam, passing from source 2 through the chopper region traversed by shutter 5 for simultaneous interruption with the sample beam, then through a reference will 14 similar to the sample cell 7, except that the reference cell contains a fixed volume of reference gas, which is preferably of the same composition as the sample gas but without the particular component that is to be detected and measured. After leaving the reference cell, the reference beam enters a reference gas absorption chamber 16, which is identical with the analytical gas chamber 12 previously described.

The gas chambers 12 and 16 are part of a detector unit 21. Generally, that unit includes a flow chamber 22; a thermistor 23 mounted in the flow chamber; flow passages 24 and 26 connecting gas chambers 12 and 16, respectively, to the flow chamber; and jet orifices 28 forming the terminal portions of the passages 24 and 26. In the form of analyzer illustrated in FIG. 1, the detector unit with its constituent chambers and passages may be entirely filled with a mixture of (a) the gaseous component to be detected, or some other infrared absorbing gas, and (b) a nonabsorbing diluent gas.

Referring generally to the operation of the analyzer illustrated in FIG. 1, equivalent beams of infrared energy are transmitted along the analytical and reference paths through the sample and reference cells to the gas chambers of the detector unit. These beams are simultaneously and periodically interrupted by the rotary chopper 5, so that pulses of infrared energy at the chopping frequency pass along the two beam paths. If the pulses reaching the detector unit contain energy in those wave lengths that are absorbed by the gas in that unit, the gas therein will be heated and tend to expand in accordance with the gas laws. If both gas chambers 12 and 16 receive and absorb the same amount of energy, the gas expansion in each of those chambers will be equal and there will be an increase in pressure therein and in passages 24 and 26 and in flow chamber 22, but there will be no gas flow through the flow chamber. This condition will prevail, for example, when the sample cell 7 contains a sample gas that includes none of the component to be detected and the reference cell 14 contains a similar gas.

In contrast, when the sample gas in cell 7 includes a given concentration of the component to be detected (that component being absent from the gas in the reference cell), some of the radiant energy in the analytical beam corresponding to the wave lengths absorbed by the component will be absorbed as the beam passes through the sample cell, but similar absorption will not occur in the reference cell. As a result, the pulses of infrared radiation reaching the analytical gas chamber 12 in the detector unit will have smaller energy in the wave lengths of interest than will the pulses of radiation reaching the reference gas chamber 16. Accordingly, less infrared energy will be absorbed and transferred into heat in chamber 12 than in chamber 16, and the gas in the latter will expand more than that in the former to create a flow of gas from chamber 16 to chamber 12 through the connecting passages and the flow chamber 22. This gas flow will cool the thermistor and the cooling effect can be measured as a change in resistance. Because of the pulsating nature of the gas expansion in the gas chambers of the detector unit, which follows the frequency of the beam chopper, the resulting temperature change in the thermistor 23 is also of a pulsating character. By making the thermistor a component of an electrical circuit such as that shown in FIG. 1, an alternating electrical signal is generated and can be measured. In its simplest from, the thermistor can be made one arm of a bridge and the varying resistance of that element detected by means of a meter across the bridge in the usual manner. It is more convenient, however, to measure the electrical output of thermistor 23 by impressing it on the input circuit of an AC amplifier, which, for best results, is tuned to the frequency of the detector signal. It is this latter circuit that is shown diagrammatically in FIG. 1; it includes the wire leads 31 and 32 from the thermistor, a source of direct current 33, a resistor 34, a capacitor 36, an amplifier 37, and a meter 38.

The thermistor bead 23 is generally ellipsoidal in shape, with a major diameter of about 0.008 inches and a minor diameter of about 0.0005 inches. Other pertinent dimensions and relationships that have been found satisfactory, although not critical, are as follows. The jet orifices may have a diameter of around 0.010 or 0.015 inches. The space between the jet orifice and the thermistor is preferably about 0.015 inches, although this can be varied somewhat without great difference in response. In addition, it is desirable that the volume of the gas flow passages 24 and 26 be small relative to the volumes of the gas chambers 12 and 16 and the volume of flow chamber 22.

Because the thermistor 23 is normally heated by the passage of current through it, its temperature is somewhat above that of its environment. Under steady state conditions, it loses heat to the surrounding gas and to the walls of the chamber in which it is located. Normally, the layer of gas immediately adjacent the thermistor will be heated to a temperature almost equal to that of the thermistor itself. It is a feature of the present invention that, by causing jet flow of gas in flow chamber 22, intimate contact between the cooler flowing gas and the thermistor is increased by dispersing the heated layer of gas normally surrounding the thermistor to produce maximum cooling of the thermistor itself. In addition, the gas flowing in the relatively large passage upstream of the orifice, when caused to pass through the orifice undergoes an increase in velocity. The resulting jet effect enhances the entrainment of other cool gas in the flow chamber, which in turn adds to the cooling effect on the thermistor. A further advantage is obtained by reason of the negative coefficient of resistance and the nonlinear response characteristic of the thermistor. If a constant voltage is applied to the thermistor and if the electrical resistance of the thermistor increases, as it does, nonlinearly with decreasing temperature, cooling the thermistor will decrease the electrical current through it, which will in turn reduce the electrical power dissipated as heat, rendering the instrument more sensitive. By reason of the enhanced cooling resulting from the jet flow of gas on the thermistor a greater than expected sensitivity is obtained because of the contributing effect of the self-reduction of electrically generated heat in the thermistor element. The greater the cooling effect, the more advantage can be taken on the nonlinear response of the thermistor.

To summarize, the detector unit previously described herein includes two sealed, communicating gas chambers having infrared transmitting windows. A flow-responsive sensor in the communicating path between the sealed chambers detects a pulsating flow of gas resulting from unequal, intermittent expansion and contraction of the enclosed gas as beams of infrared energy directed along paths to the chambers are interrupted by a chopper. To detect and measure an infrared absorbing component of a sample gas, one of the beams is made to pass through the analytical cell 7 ahead of the detector unit, so that the energy reaching one of the sealed chambers of the detector unit is attenuated by absorption from the component of interest to cause the unequal expansion and contraction referred to above.

By combining the functions of the analytical and reference cells with those of the gas absorption chambers of the detector unit it is possible to simplify the gas detecting and measuring apparatus with increased sensitivity and resolution, particularly for high absorption by the sample gas. How this may be done is shown in FIGS. 2—5.

Figure 2:
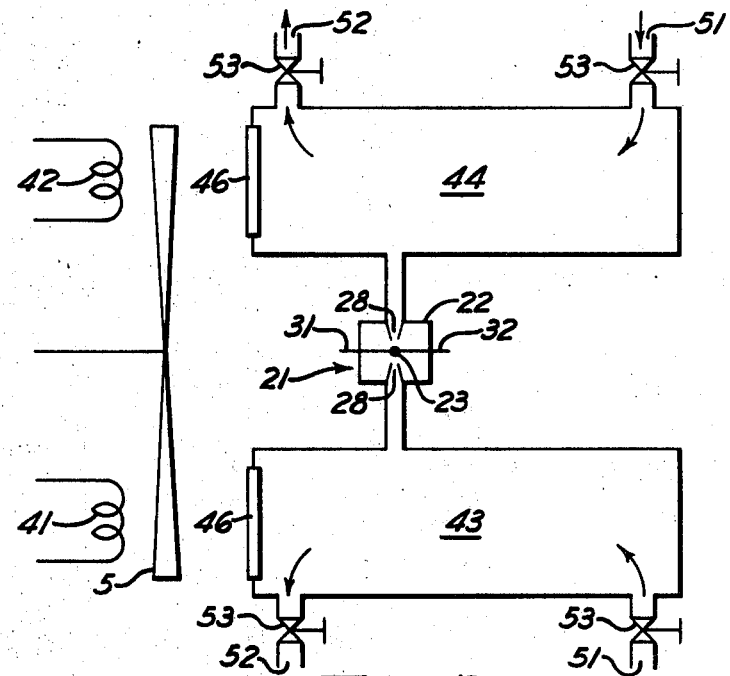

Referring to FIG. 2, energy from two infrared sources 41 and 42 is caused to travel two paths. Into each path is placed a gas absorption chamber 43 or 44 with infrared transmitting windows 46. A flow chamber 22 provided with jet orifices 28 and a sensor 23, as described in connection with FIG. 1, is connected between the two chambers. The thermistor may be connected in the electrical circuit of FIG. 1, which has not been repeated in FIGS. 2—5 but is incorporated therein by reference.

Each of chambers 43 and 44 is fitted with an inlet 51 and outlet 52, each equipped with valves 53. These valves may be mechanically coupled, if desired, so that they can be operated in concert. In practice, a dirt removing filter (not shown) could be used on the inlet and an aspirator bulb or pump (not shown) could be connected to the outlet for the purpose of drawing a gas sample into the chamber. A reference atmosphere such as clean air would be sealed in chamber 44.

In operation, the combined sample and absorption chamber 43 is purged with clean gas, free of the component to be detected, the inlet and outlet valves are closed and the meter (see FIG. 1) is set to zero by adjusting a trimmer 54 in the reference beam or by electrically balancing the circuit.

The valves of sample chamber 43 are then opened, the gas sample to be tested drawn into the chamber, and the valves are again closed. If the gas sample contains constituents which absorb in the infrared region of the spectrum, the gas in the sample chamber 43 will alternately heat and cool at the frequency of the interruptions of the beam produced by the chopper. As it heats and cools, the gas will expand and contract in accordance with gas laws.

The gas in the reference gas chamber 44 will not undergo the same intermittent expansion and contraction, because the gas component of interest is not contained in its atmosphere. Flow pulses will pass through the communicating passage as the pressure equilibrates between the two chambers twice per cycle of the chopping frequency. These flow pulses are detected and use to measure the concentration of the infrared absorbing gas in chamber 43 by the means previously described in connection with FIG. 1.

The analyzer of FIG. 2 is suitable where the sample gas contains only one significant component that absorbs infrared energy. It is also suitable where one or more absorbing constituents are present as background gases in both the sample and the reference chambers, in which case the net pressure difference can be made zero by means of a trimmer in one optical path. The introduction of an additional infrared absorbing compound, such as, the component of interest, into the sample chamber will increase the magnitude of the pressure pulses in that chamber resulting in an intermittent differential pressure between the chambers and hence flow pulses through the communicating passage.

Figure 3:
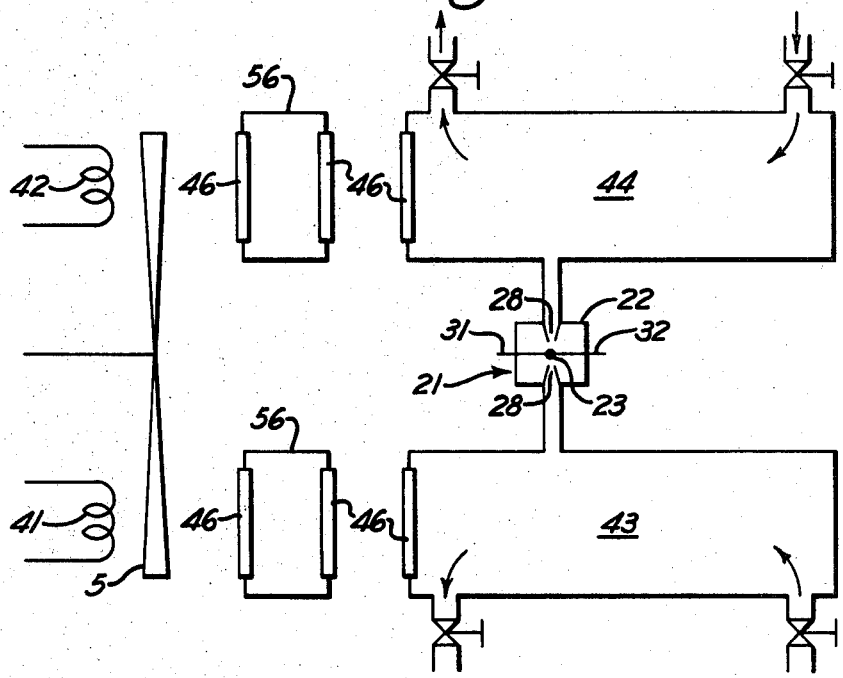

FIG. 3 shows the addition of gas filled filter cells 56 in the optical system ahead of the sample and reference gas chambers of FIG. 1. By filling these filter cells with gases that absorb in regions of the spectrum overlapping those absorbed by the component to be detected, interference from these gases when present as background gases in the sample and reference atmospheres is eliminated or greatly diminished.

FIG. 4 shows a preferred form of apparatus in which a filter cell 61 in one beam is filled with the component of interest (say, carbon dioxide) and the other filter cell 62 with air, and the sample to be examined (say, flue gas) is initially passed through the sample chamber 63 and reference chamber 64 in series through a connecting conduit 66, by means of the valves 67. After both chambers 63 and 64 and flow chamber 22 and its connecting passages have been flushed out with sample gas, valves 67 are closed. In this case, the infrared energy reaching the sample in chamber 63 will be attenuated in the spectral region absorbed by the gas of interest (carbon dioxide). The energy reaching chamber 64 will not be so attenuated. If carbon dioxide is present in the gas sample, flow pulses will be generated in the communicating flow chamber as described previously.

FIG. 5 shows one way in which an infrared absorbing gas component of interest can be detected and measured in a flowing sample stream, as opposed to the static flow conditions previously described. In this case, the sample gas is made to pass continuously through the two gas chambers 71 and 72 by way of the flow chamber 22 and its connecting passages 24 and 26, which are connected to the adjacent gas chambers near the ends of those chambers. Using well-known methods of flow regulation, the flow rate through the flow chamber can be brought to a relatively constant value and the thermistor sensor 23 in the passage will assume a steady state response. When, through the intermittent absorption of infrared energy in one of the chambers as discussed above, pulses of differential pressure are generated between the chambers 71 and 72, the flow through the connecting flow chamber will be modulated. The modulation frequency will be twice that of the beam interrupter as the pressure differential builds up and decays. By measuring the resistance of the thermistor with the electrical circuit tuned to the modulation frequency, the concentration of the infrared absorbing gas in the sample stream can be continuously monitored. Fluctuations in flow that do not occur at the modulation frequency are discriminated against.

Even greater discrimination can be achieved by using second flow chamber 73, as also shown in FIG. 5. This second chamber is similar in construction to flow chamber 22 and has a thermistor sensor 74, which is subjected to all of the flow variations to which sensor 23 in flow chamber 22 is subjected, except variations caused by the intermittent expansion and contraction of the gas in chamber 71. By making the two flow sensors adjacent arms of a conventional wheatstone bridge electrical circuit (not shown), the second sensor compensates for background and environmental changes.

The infrared gas analyzers so far described are commonly referred to as nondispersive analyzers, in which the total spectrum of infrared energy from a source is passed simultaneously through the gas being analyzed and absorption of specific wave lengths is measured by means of selective detectors or by selective filtering. The detector unit of the present invention record can, however, be used with dispersive type analyzers with attendant advantages and simplification of apparatus.

In dispersion type analyzers, the energy from the infrared source is split into many component wave lengths by passing it through a prism or reflecting if off a ruled grating. The dispersed component wave lengths are then caused successively to traverse a slit, as by rotation of the prism or grating, and so passed individually or, at least in narrow bands, through the sample to be analyzed to a detector that responds to all wave lengths. Identification and measurement of the components in the sample are made by plotting the attenuation against the wave length of the incident light.

In the present invention, the functions of the sample cell and the detector are combined, thus simplifying and eliminating many parts of the optical system required in conventional dispersive analyzers, for example of the type described in "Small Prism Infrared Spectrometry" by Barnes, McDonald, Williams and Kinnaird, Journal of Applied Physics, Vol. 16, Feb. 1945. By combining the detector and sample chambers, a large surface can be presented to the infrared beam thus increasing sensitivity and making possible measurements not practical with conventional dispersion-type instruments.

Referring to FIG. 6, infrared energy generated by a source 81, such as a heated helix of nichrome wire, is passed through a beam chopper 82 to a collimating mirror 83. The collimated rays are passed to and through a prism 84 where their paths are refracted, more or less, dependent upon their wave lengths. In the figure are shown the paths of two rays 86 and 87 of monochromatic light. From the prism the rays proceed to mirror 88, which focuses them to pass through a slit 89 and into the combination sample and detector absorption chamber 91.

The sample gas to be analyzed is placed in chamber 91, which is part of a detector unit of the type previously described herein. In practice, the second gas chamber 92 would also be filled with the sample gas, although tests of very short duration could be made with any other gas in chamber 92, because of the restriction to mixing of the gases offered by the orifices in the flow chamber 22 connecting the two gas chambers. A suggested means of filling chambers 91, 92 and 22 with the sample gas is to evacuate the chambers through valves 94 and 96 followed by back filling with the sample gas. An alternate method is to flush the chambers with the sample gas by having it enter at one valved port, flow through the chambers, and exit at the other valved port.

Periodic interruption of the beam by the chopper causes the infrared energy to each chamber 91 in pulses. If the sample gas contains a component that absorbs energy of the wave length directed into it by the optical system, it will expand and contract as it gains and loses heat at the frequency of the pulses. As the gas expands it will flow through flow chamber 22 as the pressure equilibrates between gas chambers 91 and 92. As it cools and contracts, a second flow pulse will occur as the gas flows back to again equalize the pressure. As described in connection with FIG. 1, the flow chamber 22 is provided with jet orifices 28 for increasing the velocity of flow over a heated thermistor 23 of very small mass, which is connected in an electrical circuit so that changes in thermistor resistance can be amplified and measured.

In order to traverse the wave lengths of infrared light and have them pass individually into gas chamber 91, the prism 84 which disperses the light is mounted on a platform 88, which can be rotated by means of the worm and gear drive arrangement 89 shown in broken lines in FIG. 6.

As is usual in the spectrometer art, the drive mechanism which rotates the prism can be keyed to or synchronized with a chart drive (not shown), so that plotting the output of the flow detector against prism angle can be easily accomplished. Since flow detector output is proportional to absorption of infrared energy in the gas sample and the wave length of light reaching the cell is dependent upon prism angle of rotation, the chart record portrays the absorption spectrum of the gas in the detector.

One of the advantages of this spectrometer over previous ones is that a positive rather than negative measurement is made. In prior spectrometers, the measurement made is the difference between the infrared energy reaching the detector with and without the gas sample in the path. It sometimes happens that this difference is very small and is obliterated by other losses in the optical system. In the spectrometer described herein, because of the detector unit of this invention, the absorption is measured directly. As a result, the volume of the gas chamber 91 can be made large so that even very weak absorptions can be detected.

In measuring the absorption of very opaque gases, the amount of energy reaching the detector unit in prior art spectrometers is very small, because it is attenuated in a separate sample chamber before reaching the detector, so that accurate measurements of small differences are difficult. In the present spectrometer, strongly absorbing gases produce strong rather than weak response.

I claim:

1. In an infrared gas analyzer of the type in which the component of interest in a gas sample is selectively detected and measured by its absorption of a pulsed beam of infrared energy emitted by a source of such energy, the improvement comprising: first and second gas chambers at least one of which chambers is adapted to be irradiated by a pulsed beam of infrared energy and to contain the gas sample to be analyzed, and the other of which chambers contains a gas, a gas flow chamber, a separate passage connecting each gas chamber to the flow chamber and providing relatively high velocity gas flow in the flow chamber as gas flows from one chamber to the other in response to the alternate expansion and contraction of gas in at least one of the chambers when subjected to said pulsed infrared energy, an electrically heated resistance sensor responsive to cooling by gas flow and having a rate of change of resistance that varies inversely with temperature, the sensor being mounted in the flow chamber in the path of the high velocity gas flow from the passages to enhance the cooling effect of such gas flow by the entrainment of cool gas in the flow chamber, and electrical circuit means for measuring the change in resistance of the sensor when subjected to such gas flow.

2. Apparatus according to claim 1, in which each passage terminates in a jet orifice member and in which the jet orifices are substantially axially aligned with each other, and in which the sensor is mounted substantially midway between the orifices and intersecting their axes.

3. Apparatus according to claim 1, in which the sensor is a thermistor bead.

4. Apparatus according to claim 1, in which the first gas chamber is irradiated and contains the entire gas sample to be analyzed.

5. Apparatus according to claim 1, in which both gas chambers are irradiated by separate pulsed beams of infrared energy, and in which the first gas chamber contains the entire gas sample that is to be analyzed and the second gas chamber contains a reference gas that does not include the component of interest.

6. Apparatus according to claim 5 that also includes a separate filter cell in the path of each infrared energy beam between the source and the gas chambers, each filter cell containing a gas absorbing infrared energy in a first region of the spectrum overlapping a second region absorbed by the component of interest, thereby to counteract interference from background gas in the sample absorbing radiation in said first region.

7. Apparatus according to claim 1, in which both gas chambers are irradiated by separate pulsed beams of infrared energy and, together with the gas flow chamber, contain the entire gas sample to be analyzed, and in which a filter cell is disposed in the path of the infrared energy beam between the source and the second gas chamber, the cell containing a gas that absorbs infrared energy in the same region of the spectrum absorbed by the component of interest.

8. Apparatus according to claim 7 that also includes a conduit connecting the two gas chambers for initially flushing those chambers with the sample gas and means for shutting off gas flow through the conduit during analysis of the gas sample.

9. Apparatus according to claim 7, in which a second filter cell is disposed in the path of the infrared energy beam between the source and the first gas chamber, said second cell containing a gas absorbing infrared radiation in a first region of the spectrum overlapping a second region absorbed by the component of interest, thereby to counteract interference from background gas in the sample absorbing radiation in said first region.

10. Apparatus according to claim 1, in which both gas chambers are irradiated by separate pulsed beams of infrared energy, and in which means are provided for continuously flowing the gas sample sequentially through one of the gas chambers and the flow chamber and the other gas chamber, and in which a filter cell is disposed in the path of the infrared energy beam between the source and one of the gas chambers, the cell containing a gas that absorbs infrared energy in the same region of the spectrum absorbed by the component of interest, whereby irradiation of both gas chambers will modulate the gas flow through the flow chamber at a frequency twice that of the pulsed beam of infrared energy, the electrical circuit including means for tuning the circuit to the modulation frequency.

11. Apparatus according to claim 10, in which the passages connect the flow chamber to the gas chambers adjacent the ends of the latter.

12. Apparatus according to claim 10 that also includes a second filter cell disposed in the path of the infrared energy beam between the source and the first gas chamber, said second cell containing a gas absorbing infrared radiation in a first region of the spectrum overlapping a second region absorbed by the component of interest, thereby to counteract interference from background gas in the sample absorbing radiation in said first region.

13. Apparatus according to claim 1, in which only the first gas chamber is irradiated by a pulsed beam of infrared energy, and that also includes dispersion means disposed in the path of said beam between the source and the first gas chamber for splitting the beam into various component wave lengths, and directing means for causing said component wave lengths successively to traverse the first gas chamber for measuring the infrared absorption at different wave lengths by the gas in that chamber.

14. Apparatus according to claim 13, in which the dispersion means include an optical prism.

15. Apparatus according to claim 13, in which the dispersion means include an optical prism and the directing means include means for rotating the prism.

16. In an infrared gas analyzer of the type in which the component of interest in a gas sample is selectively detected and measured by its absorption of a pulsed beam of infrared energy emitted by a source of such energy, the improvement comprising: first and second gas chambers both of which are adapted to be irradiated by a pulsed beam of infrared energy and to contain the gas sample to be analyzed, a filter cell containing a gas that absorbs infrared energy in the same region of the spectrum absorbed by the component of interest disposed in the path of the radiation beam between the source and one of the gas chambers, first and second gas flow chambers, a separate passage connecting each gas chamber to the first flow chamber and connecting the second gas chamber to the second flow chamber, the passages providing relatively high velocity gas flow in the flow chambers as gas flows from one of the gas chambers in response to the alternate expansion and contraction of gas in at least one of those chambers when subjected to said pulsed infrared energy means for continuously flowing the gas sample sequentially through the first gas chamber and the first flow chamber and the second gas chamber and finally through the second flow chamber, an electrically heated resistance sensor responsive to cooling by gas flow and having a rate of change or resistance that varies inversely with temperature mounted in each of the flow chambers in the path of the high velocity gas flow to enhance the cooling effect of such gas flow by the entrainment of cool gas in the flow chamber, and electrical circuit means for measuring the change in resistance of the sensors when subjected to such gas flow.

17. Apparatus according to claim 16, in which the passages connect the first flow chamber to the gas chambers adjacent one end of each gas chamber and in which the second flow chamber is connected to the other end of the downstream gas chamber.

18. Apparatus according to claim 16 that also includes a second filter cell disposed in the path of the infrared energy beam between the source and the other gas chamber, said second cell containing a gas absorbing infrared radiation in a first region of the spectrum overlapping a second region absorbed by the component of interest, thereby to counteract interference from background gas in the sample absorbing radiation in said first region.